Figure 4:
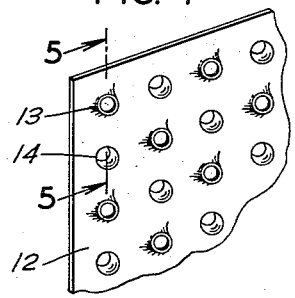

June 3, 1958 C. T. DENKER 2,836,863
PANEL STRUCTURES
Filed April 13, 1953 2 Sheets-Sheet 1

INVENTOR.
CHARLES T. DENKER
BY
*Wallace and Cannon*
ATTORNEYS

June 3, 1958 C. T. DENKER 2,836,863
PANEL STRUCTURES
Filed April 13, 1953 2 Sheets-Sheet 2
FIG. 6
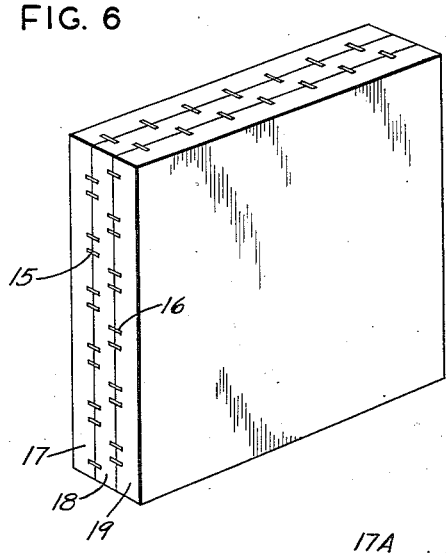
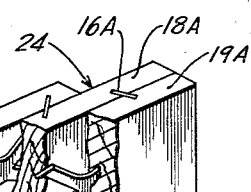
FIG. 7
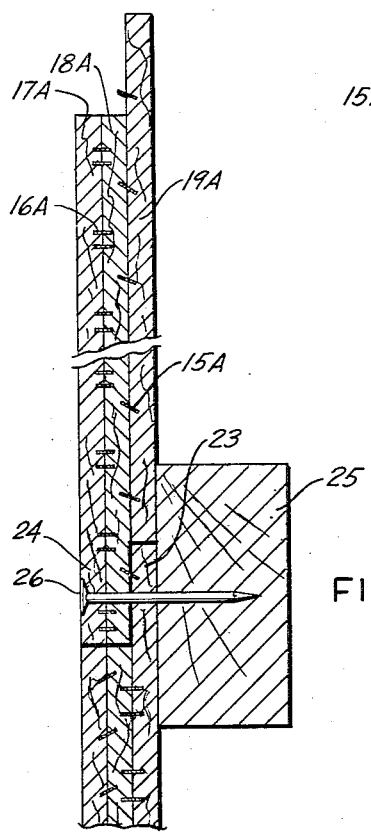
FIG. 8
INVENTOR.
CHARLES T. DENKER
BY
*Wallace and Cannon*
ATTORNEYS United States Patent Office 2,836,863
Patented June 3, 1958

2,836,863
PANEL STRUCTURES
Charles T. Denker, Chicago, Ill.
Application April 13, 1953, Serial No. 348,174
4 Claims. (Cl. 20—91)

This invention relates to laminated construction materials and more particularly to the reinforcement thereof.

Laminated construction materials, such as plywood, have been afforded heretofore by laying flat sheets, such as thin slabs of wood, one upon the other and adhesively connecting the same. Such materials embody sufficient strength to enable them to be used in a variety of ways, but there are instances where such materials cannot be employed and a primary object of this invention is to reinforce materials of the aforesaid character so as to enable such materials to be used in a conventional manner and also in other ways not possible with previous arrangements.

Another object of this invention is to interpose a metallic ply between plies of wood or kindred material and to at least partially embed portions of the metallic ply in the wood or like plies arranged on opposite sides thereof, and an ancillary object is to adhesively inter-connect the plies of wood or the like afforded on opposite sides of a metallic reinforcing ply.

Yet another object of this invention is to afford a laminated construction material wherein at least two metallic plies or reinforcements are afforded and to embed such plies or reinforcements in plies of wood or the like respectively arranged on opposite sides of such reinforcements and to adhesively or otherwise secure together the various plies constituting the laminated construction material including the plies on opposite sides of the metallic reinforcements.

Another object is to embed at least one metallic reinforcement in adjacent plies of a panel or laminated construction material and to extend at least one ply on one side of the metallic reinforcement in such a way as to afford an overhang embodying a face having at least a portion of the metallic reinforcement embedded therein and to provide another and opposite overhanging portion embodying at least the ply on the other side of said reinforcement that is extended so as to expose a face of the ply free of reinforcement.

Other and more specific objects are to utilize expanded metal as a reinforcement in a laminated construction material; to embed such expanded metal in plies of the material disposed on opposite sides thereof; and to adhesively interconnect the plies on opposite sides of a reinforcement of the aforesaid character to thereby afford a united and reinforced laminated construction material.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 1:
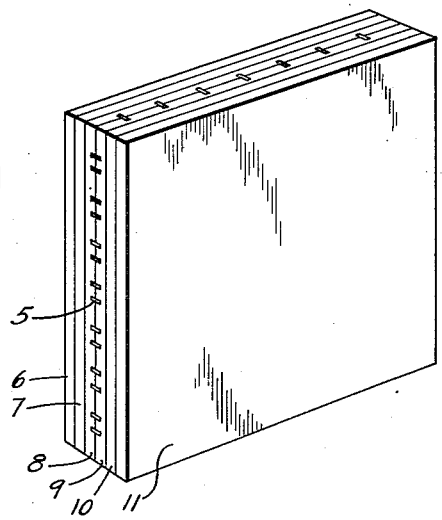
Figure 5:
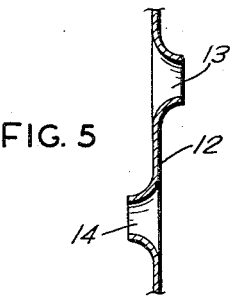
Figure 2:
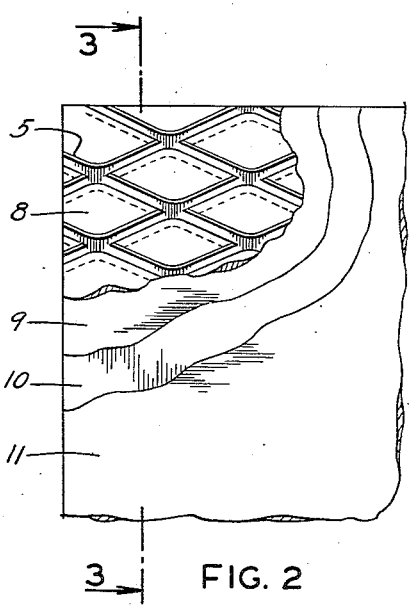
Figure 3:
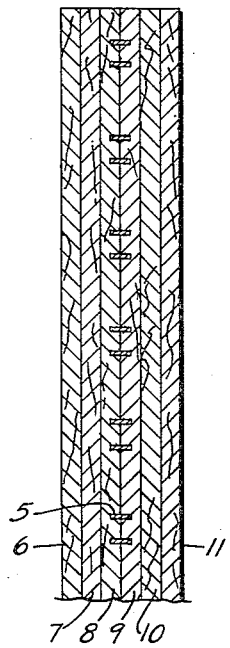

In the drawings:
Fig. 1 is a perspective view of an embodiment of my invention;
Fig. 2 is a plan view of the embodiment shown in Fig. 1 wherein super-imposed plies on one side of the metallic reinforcement are successively broken away to expose a portion of the metallic reinforcement;
Fig. 3 is a sectional detail view taken substantially on the line 3—3 on Fig. 2;
Fig. 4 is a fragmentary perspective view of a form of metallic reinforcement that may be utilized in the practice of this invention;
Fig. 5 is a sectional view taken substantially on the line 5—5 on Fig. 4;
Fig. 6 is a perspective view of yet another embodiment of my invention;
Fig. 7 is a perspective view of yet another embodiment of my invention somewhat similar to the embodiment shown in Fig. 6 and wherein super-imposed plies are broken away; and
Fig. 8 is a longitudinal sectional view illustrating an adaptation of the form of my invention shown in Fig. 7.

My invention is embodied in laminated construction materials of which plywood is an example and is utilized in instances where a material is comprised of a plurality of layers that are usually adhesively secured together. Where the layers are of wood it is customary to extend the grain in adjacent layers in different directions.

My invention resides in providing at least one metallic ply in a laminated construction material, and in the form of my invention shown in Figs. 1 to 3, inclusive, I resort to a sheet of expanded metal 5 as the metallic ply. Expanded metal includes arms that extend at an angle to the plane of a sheet thereof so as to thereby afford somewhat of a tooth or cutting edge. When a sheet of this material is to be utilized to reinforce a laminated construction material, the sheet 5 is interposed between two plys of wood or the like of which the material is to be comprised. A suitable adhesive is introduced between the adjacent faces of the plys 8 and 9 on opposite sides of the sheet metal reinforce 5. Dependent upon the use to which the laminated construction material is to be put, additional plys will be incorporated as, for example, the plys 7 and 10 may be arranged respectively outwardly of the plys 8 and 9. The plys 7 and 8 and 9 and 10 will be connected in the usual way by an adhesive. If desired, still additional plys may be provided and the plys 6 and 11 are exemplary of this, these plys being arranged outwardly of the plys 7 and 10 and being joined thereto in the manner explained hereinabove with reference to the plys 7 and 8 and 9 and 10.

When the number of plys has been determined, these are laid one upon the other with the metallic reinforce as 5 between the medially disposed plys of wood or the like and, as is customary in the art, an adhesive is introduced between adjacent faces of the respective plys. This laminated arrangement is then subjected to pressure sufficient to cause the expanded metal reinforce 5 to become embedded in the plys as 8 and 9 on opposite sides thereof. Such pressure will also be effective to unite the other plys of the material in a conventional way. The reinforce 5 materially strengthens the laminated material and enables the material to be employed in instances where conventional plywood could not be employed.

The metallic reinforcement need not necessarily be expanded metal, and in Figs. 4 and 5 I have shown a metallic sheet 12 which has protuberances as 13 and 14 respectively extended outwardly from the opposite flat faces of the sheet 12, such protuberances in this instance being generally tubular in character and terminating in annular edges which may readily penetrate the material that is to be associated therewith. The sheet 12 will be employed in the same manner as the sheet of expanded metal 5 and the protuberances as 13 and 14 will become embedded in adjacent plys as 8 and 9 when the laminated arrangement is subjected to pressure, as described hereinabove. The protuberances as 13 and 14 have open ends to permit adhesive to flow therethrough, and this adhesive, together with the embedding of the protuberances as 13 and 14 in the plys as 8 and 9, insure that the arrangement is firmly united.

In Fig. 6 I have illustrated a further form of my invention. In this form the laminated construction material includes two metallic reinforcements as the sheets of expanded metal 15 and 16. The sheet 15 is disposed between plys as 17 and 18 while the sheet 16 is disposed between plys as 19 and 20; and the plys 17, 18 and 19 may be relatively thick as shown, although such increased thickness is not essential. An adhesive is applied between the various plys and the laminated structure is then subjected to pressure so as to embed the metallic reinforce in the plys adjacent thereto, as has been explained hereinabove with reference to the expanded metal reinforce 5.

A further modified form of my invention is illustrated in Figs. 7 and 8. The laminated material there illustrated is similar to that shown in Fig. 6, and those elements in Figs. 7 and 8 which correspond to the elements shown in Fig. 6 have the same reference character applied thereto in Figs. 7 and 8 as that used in Fig. 6 but the suffix "A" is added to these reference characters in Figs. 7 and 8.

The material shown in Figs. 7 and 8 is in the form of a panel and is so arranged that along one edge of the panel the plys 18A and 19A and the metallic reinforcement 15A are extended outwardly so as to afford an overhanging portion generally indicated by 23. Along the opposite edges of the panel the plys 18A and 19A, and the metallic reinforce 16A are extended to afford an overhanging portion generally indicated by 24. It will be noted that the metallic reinforce 15A is disposed on the inner face of the overhanging portion 23, but the inner face of the overhanging portion 24 is devoid of such a reinforcement. This enables panels such as are shown in Fig. 7 to be utilized in the manner shown in Fig. 8 where adjacent panels are shown as connected to a studding 25 by a nail 26. By referring to Fig. 8 it will be noted that the overhanging portion 23 on one panel is disposed inwardly of the overhanging portion 24 of an adjacent panel. When the parts are so arranged, an adhesive may be disposed between the inner faces of the overhanging portions 23 and 24, if desired. However, as an incident to the driving in of the nail as 26 the reinforce as 15A is forced into the adjacent face of the overhanging portion 24 and thereby in effect a continuous reinforced wall arrangement is afforded.

It will be manifest from the foregoing description that I have provided an arrangement which enables the hereinabove described and kindred objects to be realized. Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a panel structural member for building walls and like purposes, a reinforcing ply formed from sheet metal having penetrating elements struck therefrom so as to extend from opposite faces of the sheet at spaced points, a pair of relatively thick, rigid plywood panels each of substantially the same thickness disposed on opposite faces of such reinforcing ply and with at least portions of said ply embedded in and interlocked with adjacent faces of said panels, and adhesive means disposed between said panels and said ply to secure said ply and said panels together.

2. In a structural member for building and like purposes, a reinforcing ply made from sheet metal and having cutting edge elements facing in opposite directions from said ply at spaced points throughout the area thereof, a pair of relatively thick, rigid plywood panels of the same size as said reinforcing ply, one of said panels being disposed against one face of said ply in registry with said ply, and the other of said panels being disposed against the other face of said ply in a laterally offset relation to afford oppositely facing lap joints at opposite edges of the panels, said cutting edge elements being disposed in penetrating relation to said panels, and adhesive means disposed between said panels and said ply to secure said ply and said panels together.

3. In a panel structural member for building walls and like purposes, a reinforcing ply made from expanded sheet metal affording webs forming cutting edge elements facing in opposite directions from said ply at spaced points throughout the area thereof, a pair of relatively thick, rigid plywood panels each of substantially the same thickness of the same size as said reinforcing ply, one of said panels being disposed against one face of said reinforcing ply in registry with said ply, and the other of said panels being disposed against the other face of said ply in a laterally offset relation to afford oppositely facing cup joints at opposite edges of the panels, said cutting edge elements being disposed in penetrating relation to said panels, and adhesive means disposed between said panels and said ply to secure said ply and said panels together.

4. A structural panel member for building and like purposes comprising a first relatively thick, rigid plywood panel including at least two wood plys bonded to each other; a second similar plywood panel; a sheet of expanded metal, comprising a network of metal elements intersecting in a regular pattern and each affording cutting edges extending outwardly from both sides of said sheet, pressed between said two plywood panels with said cutting edges of said expanded metal embedded in adjacent faces of said panels to interlock said panels with said sheet of expanded metal and with each other; and adhesive material, disposed between said panels and substantially filling the interstices in said expanded metal, for bonding said panels and said expanded metal to each other.

References Cited in the file of this patent

UNITED STATES PATENTS

| | | |
|---|---|---|
| 379,027 | Pickering | Mar. 6, 1888 |
| 488,809 | Heepe | Dec. 27, 1892 |
| 886,813 | Jones | May 5, 1908 |
| 1,074,404 | Barnhart | Sept. 30, 1913 |
| 1,456,599 | Jensen | May 29, 1923 |
| 1,659,539 | Judson | Feb. 14, 1928 |
| 1,915,221 | Fitzgerald | June 20, 1933 |
| 2,011,130 | Ward | Aug. 13, 1935 |
| 2,089,550 | Hacker | Aug. 10, 1937 |
| 2,329,366 | Weill et al. | Sept. 14, 1943 |
| 2,372,929 | Blessing | Apr. 3, 1945 |
| 2,401,281 | Webb | May 28, 1946 |
| 2,427,879 | Robertson et al. | Sept. 23, 1947 |